United States Patent [19]

Gosswiller et al.

[11] Patent Number: 5,584,560
[45] Date of Patent: Dec. 17, 1996

[54] REMOTE CONTROL SPOTLIGHT

[75] Inventors: Earl W. Gosswiller, Willowbrook; Philip C. Hawken, Woodridge; Paul D. Graham, La Grange Park, all of Ill.

[73] Assignee: Federal Signal Corporation, Oak Brook, Ill.

[21] Appl. No.: 475,354

[22] Filed: Jun. 7, 1995

Related U.S. Application Data

[63] Continuation-in-part of Ser. No. 290,349, Aug. 15, 1994, abandoned, which is a continuation-in-part of Ser. No. 123,129, Sep. 17, 1993, abandoned.

[51] Int. Cl.$^6$ ................................................ F21V 21/16
[52] U.S. Cl. ..................... 362/66; 362/233; 362/287; 362/286; 362/419; 362/425; 362/35; 362/272
[58] Field of Search ...................... 362/287, 286, 362/80, 322, 323, 324, 419, 425, 420, 423, 233, 61, 35, 833, 269, 66, 275, 74, 428, 386, 271, 272

[56] References Cited

U.S. PATENT DOCUMENTS

| | | | |
|---|---|---|---|
| 2,817,005 | 12/1957 | Cameron | 362/425 |
| 4,488,209 | 12/1984 | Gosswiller | 362/285 |
| 4,779,168 | 10/1988 | Montgomery | 362/66 |
| 5,057,985 | 10/1991 | Kreutzer, Jr. et al. | 362/425 |
| 5,084,803 | 1/1992 | Lan | 362/35 |

OTHER PUBLICATIONS

1–Page advertisement for "II Work Light", manufactured by Visibcan (1975).

*Primary Examiner*—Denise L. Gromada
*Assistant Examiner*—Thomas M. Sember
*Attorney, Agent, or Firm*—Leydig, Voit & Mayer, Ltd.

[57] ABSTRACT

A spotlight is provided that employs stationary motors for positioning a light beam at a desired azimuth and elevation such that there is no blind spots of the light beam at the zenith of the azimuth and elevation. A drive train rotates the spotlight about a horizontal axis and allows the motor driving the rotation to have a stationary mounting in a base while at the same time providing the light beam of the spotlight with a range of elevation that exceeds 90 degrees from a horizontal reference plane at any desired azimuth. More particularly, a stationary motor drives a capstan, which includes a spool that winds and unwinds a cable connected to a lamp assembly of the spotlight for positioning the light beam at a desired elevation. The cable is communicated between the lamp assembly and the capstan by way of a central bore in a mast that supports the lamp assembly for rotation about a vertical axis.

33 Claims, 12 Drawing Sheets

REMOTE CONTROL SPOTLIGHT

This application is a continuation-in-part of U.S. patent application Ser. No. 08/290,349, filed Aug. 15, 1994 now abandoned, which is a continuation-in-part of U.S. patent application Ser. No. 08/123,129, filed Sep. 17, 1993, now abandoned.

TECHNICAL FIELD

This invention generally relates to spotlights and more particularly relates to search lights for use by emergency vehicles.

BACKGROUND OF THE INVENTION

Spotlights that are mounted to emergency vehicles and the like are well known. Traditionally, spotlights are mounted to the exterior of the vehicle at a location adjacent the user so that a mechanically connected joy stick can be operated by the user in the vehicle compartment for positioning the beam of the spotlight to illuminate a desired area. More recently, spotlights have become available that employ motor drive mechanisms for allowing the spotlight to be located remotely from the user in the passenger compartment. For these type of spotlights, it is known to provide remote control mechanisms that are connected to the spotlights by way of cables. An example of such a remote control spotlight is the Visibeam® I manufactured by Federal Signal Corporation of University Park, Ill. This spotlight rotates over approximately 360 degrees of azimuth and 120 degrees of elevation.

In prior spotlights such as the above-identified Visibeam® I, the drive motors for positioning the beam both along an azimuth and elevation are controlled by motors mounted to a stationary base assembly. In the Visibeam® I, a vertical mast is mounted in a journal supported by the base for rotation about a vertical axis. The mast supports a lamp assembly, which generates the light beam of the spotlight. A motor drives the rotation of the mast in order to position the beam of the spotlight at a desired azimuth. In order to position the light at a desired elevation, a plunger is vertically slidable within a bearing sleeve for contacting the lamp assembly of the spotlight such that the lamp assembly is rotationally biased about a horizontal axis against the plunger. A motor supported by the base raises and lowers the plunger, which thereby rotates the lamp assembly about the horizontal axis in order to position the beam of the spotlight at a desired elevation.

In other spotlights that are controlled remotely, a motor for controlling the elevation of the beam is mounted within a housing of a lamp assembly. The motor rotates about a vertical axis with the assembly. An example of such a spotlight is illustrated in U.S. Pat. No. 3,732,537. Other patents illustrating various types of spotlights and the controls therefor can be found in the following: U.S. Pat. No. 3,717,117 to Stanley; U.S. Pat. No. 3,164,838 to Heinrich; U.S. Pat. No. 1,551,805 to Davis; and, U.S. Pat. No. 576,684 to MacHaffie et al.

SUMMARY OF THE INVENTION

It is an object of the invention to provide a lightweight, yet reliable remote controlled search light for mounting to an emergency vehicle that is less expensive to manufacture yet has the same or greater range of movement of the light beam with respect to both azimuth and elevation as that of the prior art devices.

It is another object of the invention to provide a remote controlled spotlight for mounting to an emergency vehicle that can rotate through more than 360 degrees of azimuth. In this connection, it is a related object of the invention to provide a spotlight that can rotate through approximately 140 degrees of elevation.

Briefly, a remote controlled spotlight is provided for use as a search light on an emergency vehicle, which includes a mechanism for rotating the light beam over a range of approximately 140 degrees of elevation using a flexible cable alternately wound and unwound about a spool of a capstan mounted to the base of the spotlight. In order to feed the cable between the capstan and a rotatable lamp assembly for generating a light beam, a vertical mast upon which the lamp assembly is supported and rotates includes a bore opening to apertures at its top and bottom for receiving the cable. The bore in the mast allows the cable to be communicated between the lamp assembly and the capstan. The capstan is mounted for rotation driven by a motor, which is also mounted in the base of the spotlight. The motor is driven by a remote control mechanism for both clockwise and counterclockwise rotation. In one direction of rotation, the motor causes the capstan to wind the cable upon the spool. In its other direction of rotation, the motor drives the rotation of the capstan so as to release the cable. As the cable is wound and unwound, the lamp assembly rotates about an axis of rotation, which moves the light beam generated by the lamp assembly through a predetermined angle of elevation.

In order to maintain tension on the cable and thereby assure the ability of the cable to translate the rotational motion of the capstan to a rotation of the lamp assembly, the lamp assembly is spring-biased about the axis of rotation that provides for movement of the light beam through an angle of elevation. By providing a rotational bias, the cable is maintained taut when it is both wound and unwound by the capstan.

To provide the remote control spotlight of the invention with a full range of motion, the lamp assembly includes a mechanism for rotating the light beam about two complementary axes. A first axis is the axis which rotates the lamp assembly so as to move the light beam through an angle of elevation. The second axis of rotation moves the light beam through an angle of azimuth. By rotating the lamp assembly about both axes either simultaneously or consecutively, the light beam can be accurately positioned to any location throughout a full hemisphere. Preferably, the first axis is a horizontal axis about which the lamp assembly rotates and the second axis is a vertical axis about which the lamp assembly rotates.

Like the horizontal axis, the vertical axis is driven by a motor mounted to the base of the spotlight. The two motors are under the control of a user by way of the remote control mechanism connected to the motors by wires contained in a cable. A separate cable provides 12 volt D.C. power to the lamp assembly and the motors. In response to the remote control mechanism, the motors can be operated separately or in concert and at variable rates in order to position the light beam.

Rotation of the lamp assembly about each of the two axes is limited by stops. When the drive train connected to each of the motors for rotating the lamp assembly about its respective axis engages a stop, the motor stalls. In this connection, the motors are sufficiently robust to withstand momentary energization after the stops have been engaged. Therefore, the spotlight does not require expensive limit switches or the like in order to protect the motors.

Alternatively, one set of stops may be removed so that the lamp assembly continuously rotates in one direction about the vertical axis. In order to prevent torquing of the cable in such a configuration, the cable includes a swivel or pivotable link, which prevents twisting of the cable resulting from rotation of the lamp assembly about the vertical axis.

For limiting the angle of azimuth swept by the light beam, a lost motion device allows the light beam to sweep an angle of azimuth greater than 360 degrees. For limiting the angle of elevation swept by the light beam, the capstan includes a gear that engages an idler gear, which functions as a timing gear for defining the pinpoints of the range of elevation for the light beam.

While the invention will be described in some detail with reference to preferred embodiments, it will be understood that it is not intended to limit the invention to such detail. On the contrary, it is intended to cover all alternatives, modifications and equivalents which fall within the spirit and scope of the invention as defined by the appended claims.

DETAILED DESCRIPTION OF THE PREFERRED EMBODIMENT

Figure 1:
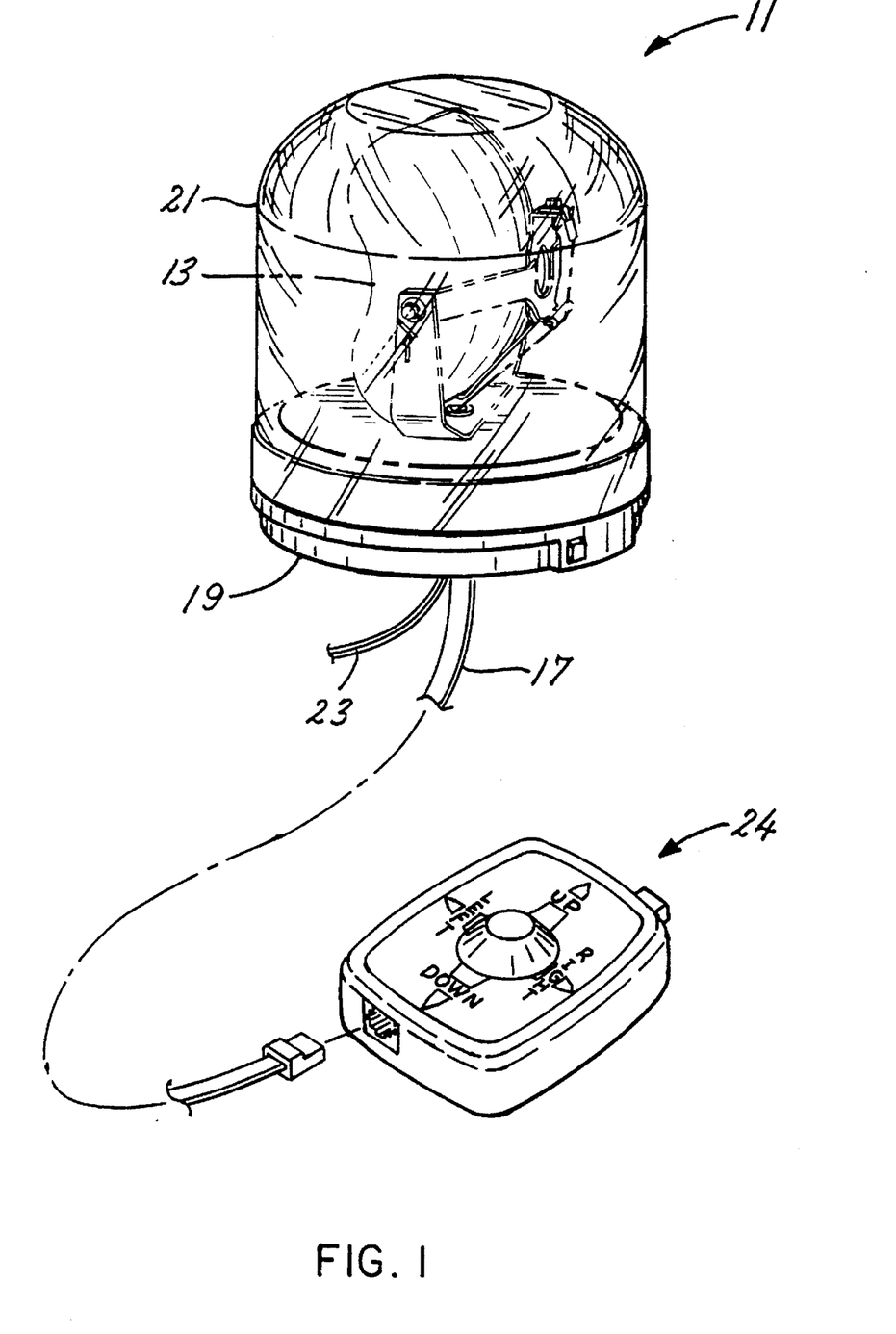
FIG. 1 is a perspective view of the spotlight of the invention according to an illustrated embodiment.
Figure 2:
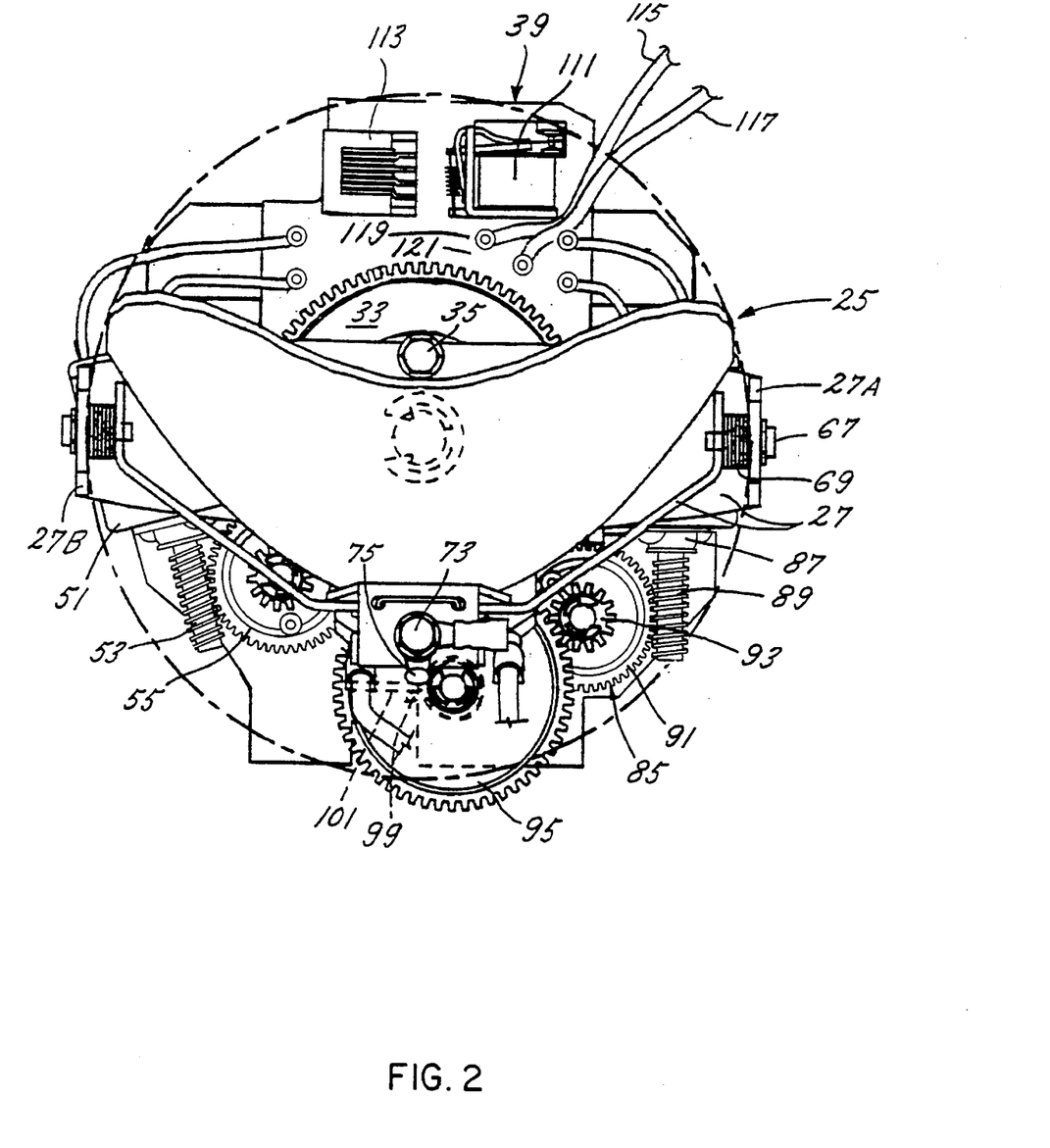
FIG. 2 is a plan view of the spotlight in FIG. 1 with the base and dome comprising the housing of the spotlight removed in order to more clearly illustrate the lamp assembly and the drive mechanism for rotating the assembly through both azimuth and elevation.
Figure 3:
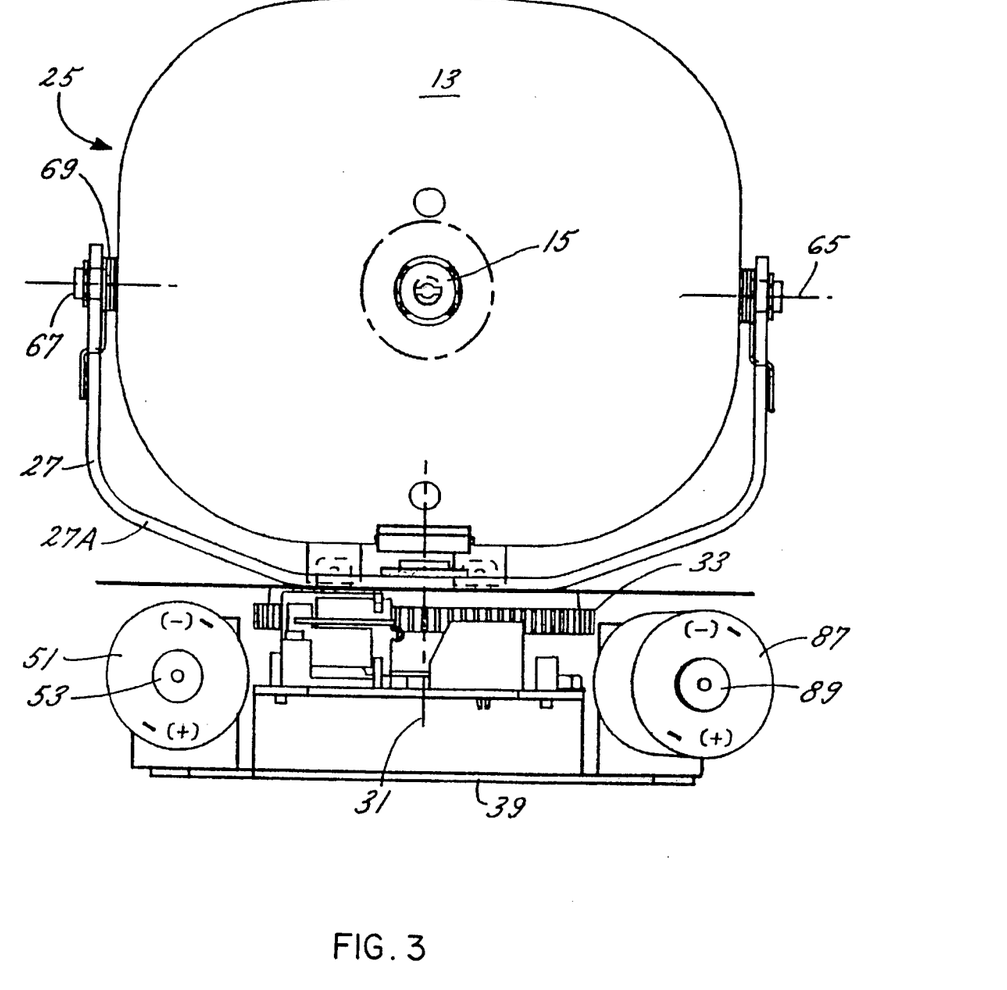
FIG. 3 is a front view of the lamp assembly and drive mechanism illustrated in FIG. 2.
Figure 4:
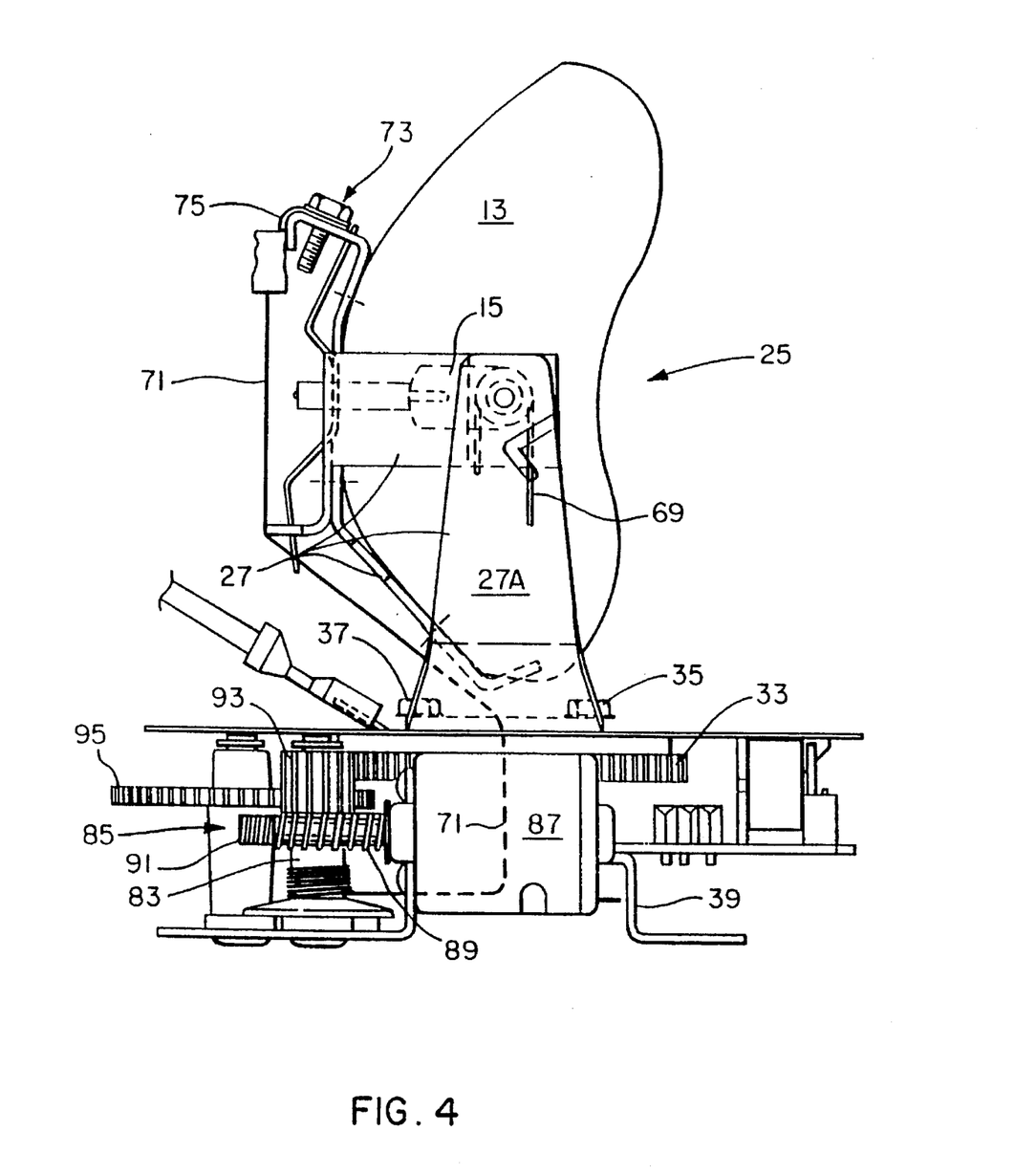
FIG. 4 is a side view of the lamp assembly and drive mechanism shown in FIG. 2.
Figure 5:
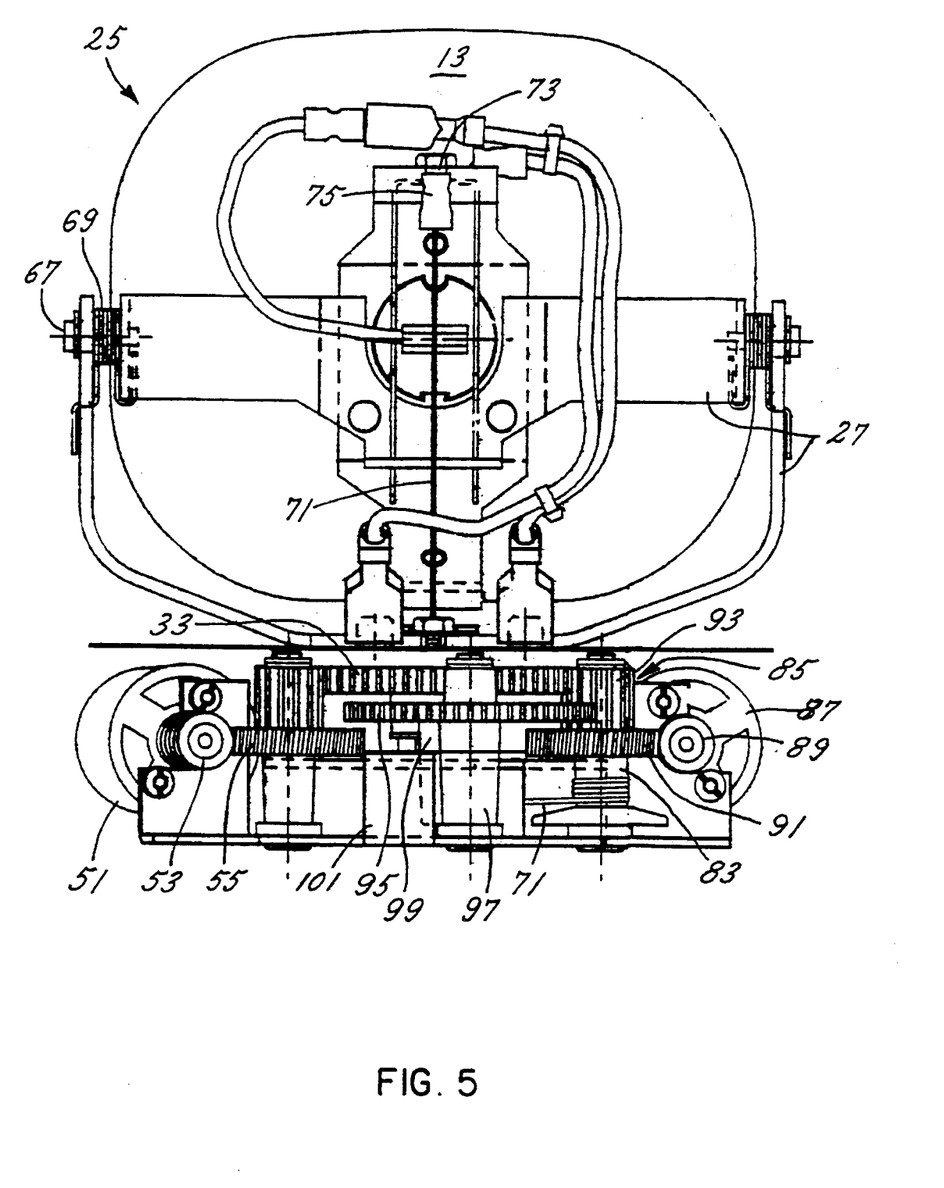
FIG. 5 is a back view of the lamp assembly and drive mechanism shown in FIG. 2.

Turning to the drawings and referring first to FIG. 1, the spotlight 11 includes a highly polished parabolic reflector 13 and a 55-watt halogen lamp 15 (best seen in FIGS. 3, 4 and 8), which combine to produce a clear, even light beam pattern. The assembly of the parabolic reflector 13 and the lamp 15 rotates over 360 degrees. It can be adjusted downwardly 35 degrees with respect to a horizontal reference plane and upwardly 105 degrees with respect to the plane to eliminate blind spots at the zenith. Peak intensity of the light beam exceeds 80,000 candela, while the lamp draws only approximately 4.2 amperes.

A remote control unit 24 fits into the palm of the user's hand, allowing the spotlight to be easily turned on and operated. Alternatively, the control unit 24 can be mounted to the vehicle (not shown), such as to the dashboard. An indicator light 25 (FIG. 9) on the remote control unit 24 reminds the user that the spotlight 11 is on.

Installation of the spotlight 11 is simple, and its compact remote control unit 24 fits virtually anywhere. It can be mounted with Velcro™ or a more secure snap holder (not shown). The control unit 24 is connected to the spotlight 11 via a wiring cable 17 whose ends employ common telephone-type connectors. The spotlight 11 can be permanently mounted to the interior or exterior of a vehicle or it can be equipped with a magnet for a removable mounting. In the illustrated embodiment, the spotlight 11 is supported on a base 19 and housed under a light transmissive dome 21. In an alternative embodiment, the spotlight 11 may be mounted within a so-called "light bar" that contains other types of emergency signalling devices—e.g., sirens, flashing and/or rotating lights. Depending on the location and type of mounting to the emergency vehicle, the spotlight 11 includes a power cord 23 that may terminate at a plug (not shown) that mates with the cigarette socket in the passenger compartment of the vehicle. If the spotlight 11 is permanently mounted to the vehicle, the power cord 23 is preferably hard-wired to a power source (not shown) and integrated into the electrical system of the vehicle in a manner well known in the art.

Depending on the type of mounting assembly employed with the spotlight 11, the spotlight, its housing and mounting are approximately 6.5 to 7.3 inches in height and 6.5 inches wide. Again depending on the type of mounting employed, the spotlight 11, its housing and mounting weigh approximately 1.3 to 1.5 pounds. Of course, if the spotlight is housed in a lightbar, its dimensions would include the extension of the housing and base required to enclosed other devices and thus would accordingly vary from the foregoing exemplary dimensions for the spotlight alone.

Figure 6:
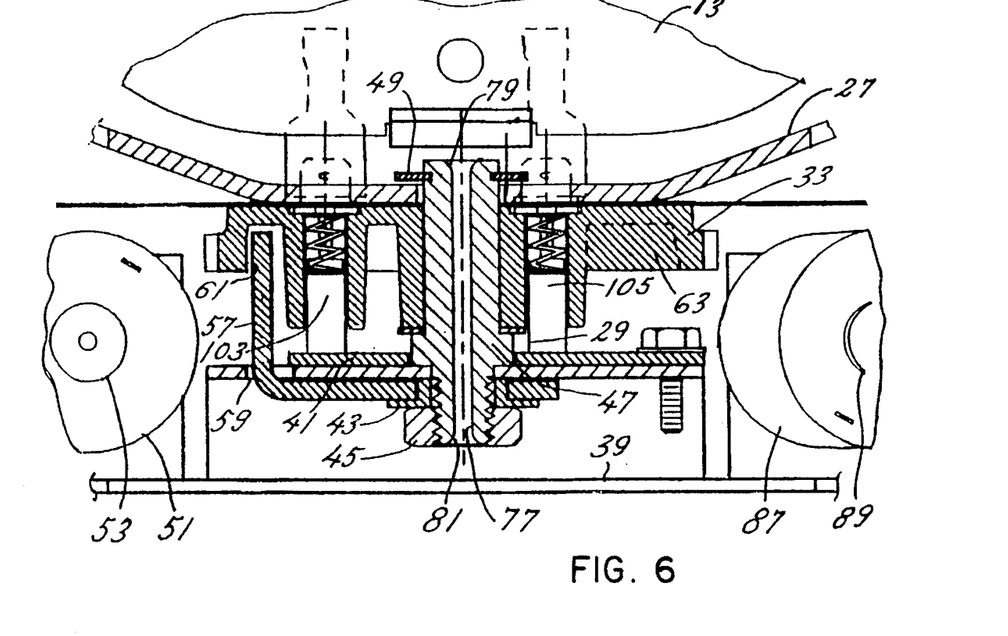
FIG. 6 is an enlarged sectional view taken along the line A—A in FIG. 2 showing the details of the mast and the associated slip ring assembly for allowing rotation of the lamp assembly about a vertical axis and for communicating power to the lamp assembly.

Turning to FIGS. 2–8, a lamp assembly 25 comprises the reflector 13, the lamp 15 and a bracket assembly 27 for supporting the reflector and lamp. A mast or hub 29, best illustrated in FIG. 6, supports the lamp assembly 25 for rotation about a first axis, which is a vertical axis 31 in the illustrated embodiment. The bracket assembly 27 for the reflector 13 is rigidly secured to a rotator gear 33 by screws 35 and 37. The hub 29 provides a bearing surface about which the rotator gear 33 rotates. A support assembly 39 is formed from sheet metal and supports the hub 29 as well as a circuit board 41 as best illustrated in FIG. 6. The hub 29 is retained in its mounting formed by the support assembly 39 by a bushing 43 and a jam nut 45 fitted to a threaded lower outer surface of the hub as illustrated in FIG. 6. A flange of the hub 29 supports a flat washer 47, which in turn supports the rotator gear 33 on the bearing surface of the hub 29. The rotator gear 33 and the lamp assembly 25 are retained on the hub 29 by a retaining ring 49.

In order to rotate the lamp assembly 25 and the rotator gear 33, a motor 51 includes a worm 53 that drives the rotation of a worm gear 55, which in turn drives the rotation of the rotator gear 33 about the bearing surface of the hub 29. The worm 53 and worm gear 55 comprise a transmission or drive train coupling the motor 51 to the rotator gear 33. Rotation of the rotator gear 33 and the lamp assembly 25 rotates the light beam generated by the reflector 13 and the lamp 15 through a range of azimuth greater than 360 degrees.

Figure 7:
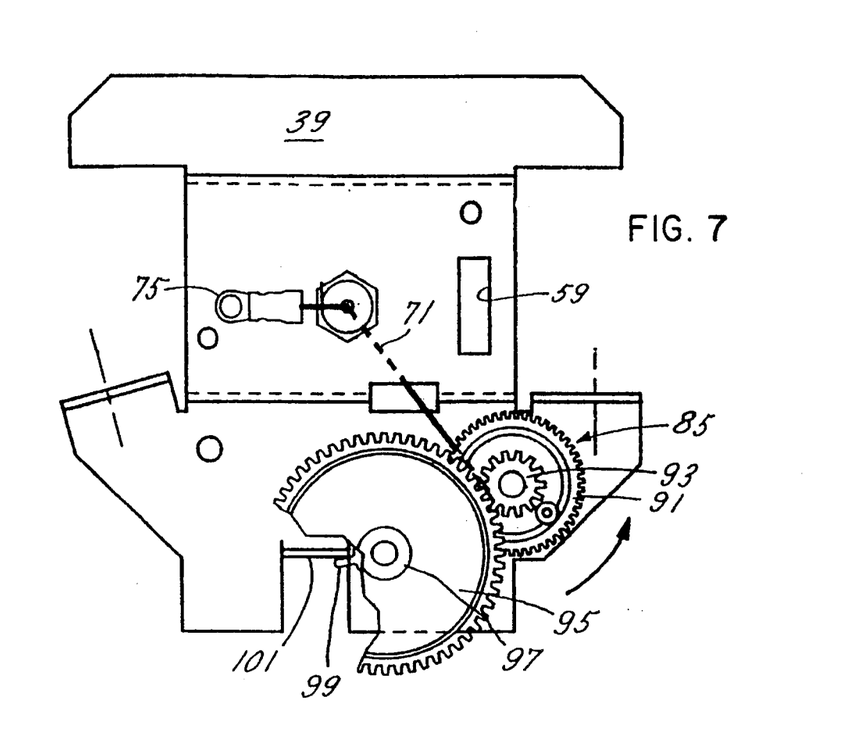
FIG. 7 is a plan view of the mounting for the drive mechanism, illustrating in isolation the drive train for rotating the beam of the spotlight about a horizontal axis in order to position the beam at a selected elevation.

Although the invention contemplates an embodiment, described below, in which the lamp assembly 25 can continuously rotate with the rotator gear 33 in either a clockwise or counterclockwise direction, a first illustrated embodiment employs a mechanical stop that provides for a full 360 degree rotation of the lamp assembly 25, but not continuous rotation in one direction. In this connection, as best seen in FIG. 6 a bracket 57 is rotationally mounted to the bushing 43, which in turn is mounted to the hub 29. The bracket 57 extends from under one of the surfaces of the support assembly 39 through a slot 59 and is received by a circumferential groove 61 on the undersurface of the rotator gear 33. As can be seen from the shape of the slot 61 in the support assembly 39 as best illustrated in FIG. 7, the bracket 57 is free to rotate only over a limited arc. With the rotator gear 33 rotating in one direction, a stop 63 formed by a discontinuity in the circumferential groove 61 engages the portion of the bracket 57 extending into the groove and rotates the bracket to one of the ends of its arcuate motion as defined by the slot 61. At this point, the stop 63 and the bracket 57 cooperate to stop the rotator gear 33 and the lamp assembly 25 from further rotation. When rotated in the reverse direction, the rotator gear 33 rotates a full 360 degrees of azimuth rotation and then again engages the bracket 57 and drives the bracket through its arcuate rotation to its opposite limit, thereby defining a lost-motion stop for the azimuth rotation of the rotator gear 33 and lamp assembly 25 that provides for rotation greater than 360 degrees.

In accordance with one important aspect of the invention, the lamp assembly 25 is rotated about a second axis 65 (FIGS. 3 and 8), which is a horizontal axis in the illustrated embodiment, in order to locate the light beam at a selected elevation through a range of approximately 105 degrees, which includes approximately 110 degrees measured from a horizontal reference plane coincident with the axis 65. By providing the foregoing range of elevation, the spotlight 11 according to the invention is free of blind spots at its zenith. To enable rotation of the lamp assembly 25 about the horizontal axis 65, the bracket assembly 27 includes two opposing arms 27A and 27B that each have a bore functioning as a bearing surface for a journal portion of a spindle 67 of the bracket assembly, which is riveted to the reflector 13. Each of the journals received by one of the bores is part of the spindle 67 that supports the reflector 13 for rotation about the horizontal axis 65. Accordingly, the two spindles 67 are axially aligned with one another and along the horizontal axis 65 for rotating the lamp assembly 25 about the horizontal axis for the purpose of positioning the light beam at a desired elevation.

At each spindle 67, a coiled spring 69 imparts a torque about the horizontal axis 65 that tends to rotate the lamp assembly 25 in a direction pointing the light beam downwardly below the reference horizontal plane, which is coincident with the horizontal axis 65. Counteracting the torque from the springs 69 is a cable 71 connected to the portion of the bracket assembly 27 riveted to the reflector 13 by a bolt 73. In order to accommodate the bolt, the cable terminates at a connector 75. The cable 71 extends through a bore 77 in the hub 29 that opens to upper and lower apertures 79 and 81, respectively. By threading the cable 71 through the bore 77, the cable is communicated to a spool 83 of a capstan 85 that is mounted on the support assembly for rotation about a vertical axis in response to a drive motor 87. As the capstan 85 rotates in one direction (e.g., clockwise), the cable 71 is wound upon the spool 83. As the cable 71 is taken up by the spool 83, the lamp assembly 25 rotates upwardly about the horizontal axis 65, thereby elevating the light beam. Alternatively, by rotating the capstan 85 in a reverse direction (e.g., counterclockwise), the cable 71 is unwound from the spool 83. As the cable 71 is freed, the torque of the springs 69 rotate the lamp assembly 25 downwardly about the horizontal axis 65.

In order to rotate the capstan 85, a drive train or transmission comprising a worm 89 and a worm gear 91 couples the capstan 85 to the drive motor 87. A spur gear 93 that is co-axial and integral with the capstan 85, its spool 83 and the worm gear 91 meshes with a timing gear 95 mounted to the support assembly 39 adjacent the capstan 85. The worm 89 mounted to the drive shaft of the motor 87 meshes with the worm gear 91 in a conventional manner to form a worm gear assembly for rotating the capstan 85 in either a clockwise or a counterclockwise direction. To rotate the capstan 85 in either direction, the motor 87 is a reversible motor such as International Components Corp., catalog model No. 2732-480GH. The capstan 85, timing gear 95 and rotator gear 33 as well as the other gears of the drive trains for each of the two drive motors 51 and 87 are preferably made of Delrin® manufactured by DuPont Corp.

The timing gear 95 includes a stem portion 97 having a flange 99 that engages a complementary flange 101 formed from the sheet metal of the support assembly 39. In a manner well known in the art, the ratio of the pitch of the teeth in the timing gear 95 to the pitch of the teeth in the spur gear 93 of the capstan 85 define the limits of rotation for the capstan. In the illustrated embodiment, the timing gear 95 is limited to 360 degrees of rotation by the stop formed by the complementary flanges 99 and 101. In this connection, the ratio of the pitches of the gear teeth is selected to provide a range of elevation for the lamp assembly 25 of approximately 140 degrees, with 105 degrees of the range above the horizontal plane in order to ensure the spotlight does not have blind spots at the zenith. In the illustrated embodiment, there are 56 teeth on the timing bear 95 and 14 teeth on the spur gear 93.

Figure 12A:
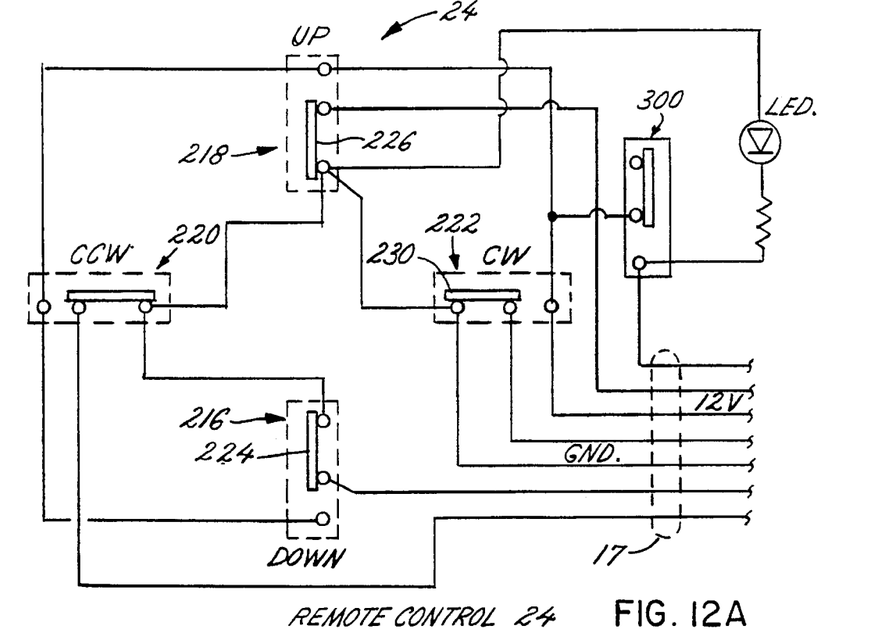
FIGS. 12A and 12B are schematic diagrams illustrating the electrical control system for remotely controlling the two motors of the spotlight either independently or in concert.
Figure 12B:
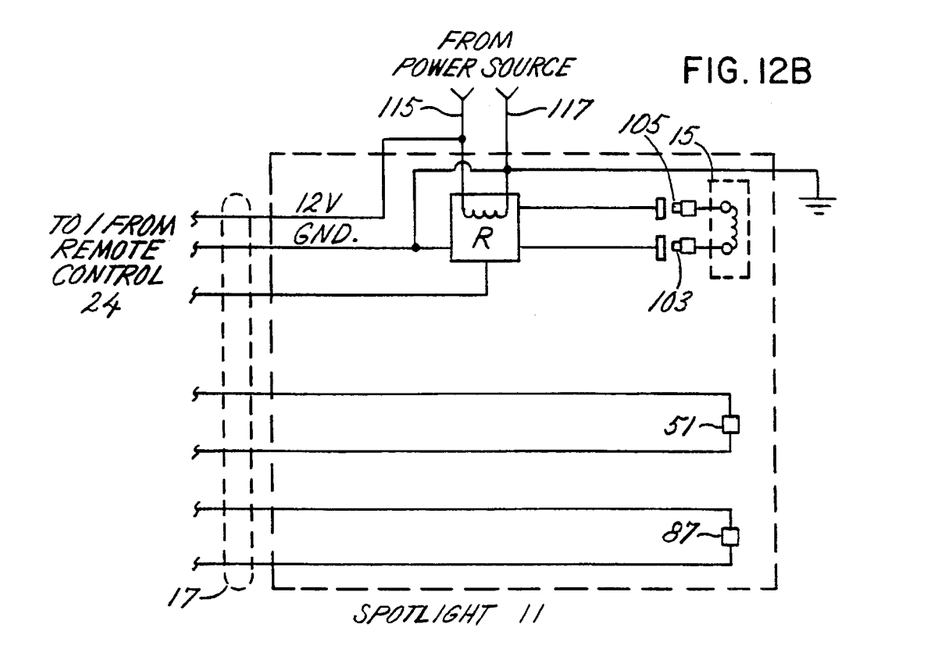
Figure 13A:
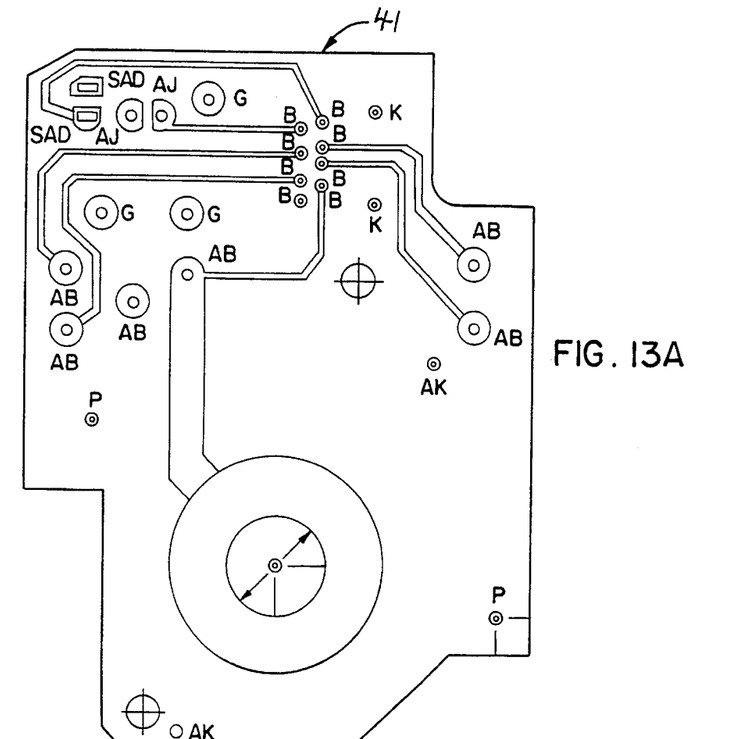
FIGS. 13A and 13B are plan views of the bottom and top sides, respectively, of the circuit board in the spotlight.
Figure 13B:
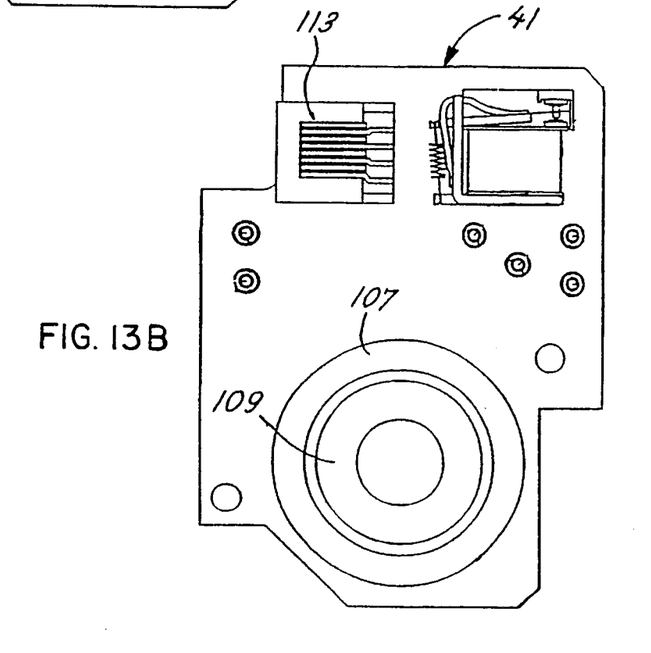

In order to communicate power to the lamp 15 mounted to the reflector, a slip ring arrangement is provided. As can be seen in FIG. 6, the rotator gear 33 provides a housing for two identical brush assemblies 103 and 105 located at different radial locations on the underside of the gear. One of the brush assemblies 105 is in contact with a first annular conductive ring 109 on the circuit board 41 for communicating a reference ground to the lamp 15. The other brush assembly 103 is in direct communication with a second annular ring 109 on the circuit board 41, which is concentric with the first, for communicating 12 volts to the lamp 15. The two sides of the printed circuit board 41 are best illustrated in FIGS. 12A and 12B. In order to control illumination of the lamp 15, a relay 111 is mounted to the circuit board 41 and under the control of the remote control unit 24. A conventional socket 113 on the circuit board 41 receives a mating socket of the cable from the remote control unit 24. Ground and 12 volt lines 115 and 117 are received at terminals 119 and 121 on the circuit board 41. Power to the lamp 15 is provided by way of the relay 111 and the slip ring arrangement. For power to the motors 51 and 87, however, the voltage from the power source is routed to the remote control unit 24. As will be appreciated from the following discussion, the power from the power cords 115 and 117 is routed through the cable 17 back to the remote control unit 24 where it is then directed to the appropriate motor in order to drive each of the two motors according to the user's desire.

Figure 8A:
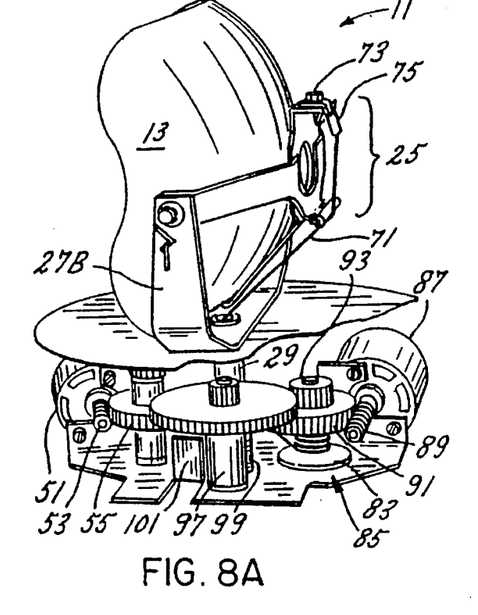
FIGS. 8A–8C illustrate the spotlight of FIG. 1 alternatively positioned to direct the light beam horizontally, at a nadir of its elevational range and at the zenith of its elevational range, respectively.
Figure 8B:
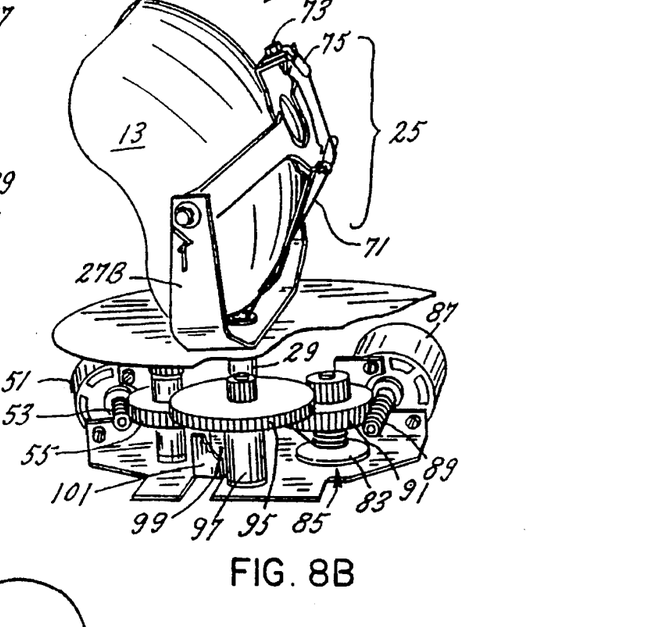
Figure 8C:
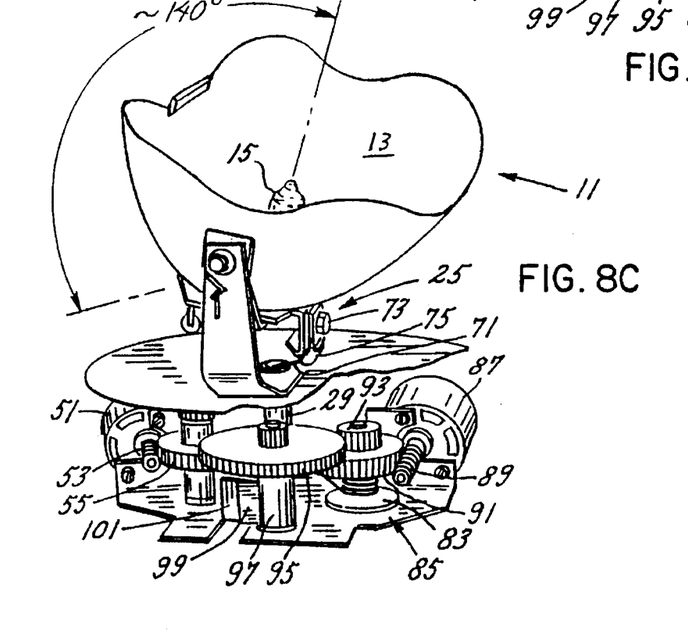

The range of elevation within which the light beam of the spotlight 11 can be positioned is best illustrated in FIGS. 8A–8C. In FIG. 8A, the reflector 13 is positioned to provide an approximately horizontal beam. As the motor 87 is rotated in one direction, the capstan 85 unwinds the cable 71 until the flange 99 of the timing gear 95 engages flange 101 of the support assembly as shown in FIG. 8B. When fully unwound, the cable 71 and timing gear 95 direct the light beam of the spotlight 11 at an angle of approximately 30 degrees below a horizontal plane. Rotation of the drive motor 87 in the opposite direction rotates the reflector 13 from its position shown in FIG. 8B to the position shown in FIG. 8C, which spans approximately 140 degrees as indicated in FIG. 8C. Both of the endpoints of the range of the elevational movement by the reflector 13 are defined by the timing gear 95. In FIG. 8C, the timing gear 95 has been driven in a clockwise direction (when viewed from above the gear) from its position in FIG. 8B, thereby rotating the flange 99 around to engage the other side of the fixed flange 101 when the reflector 13 is at its opposite end of its elevational range.

Figure 9:
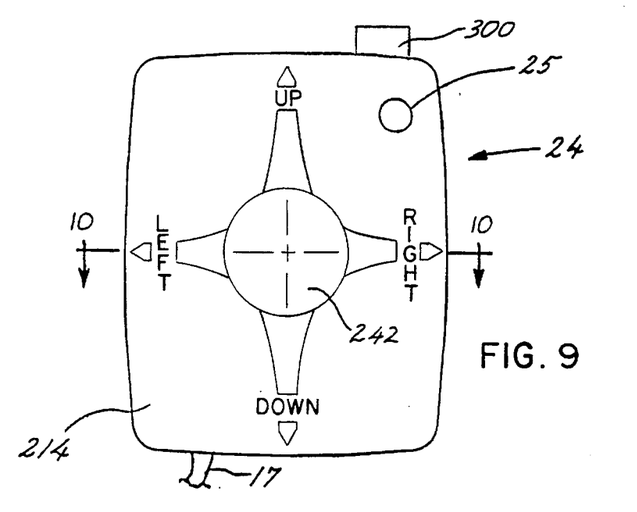
FIG. 9 is a plan view of the remote control unit for controlling the positioning of the spotlight at a desired azimuth and elevation.
Figure 10:
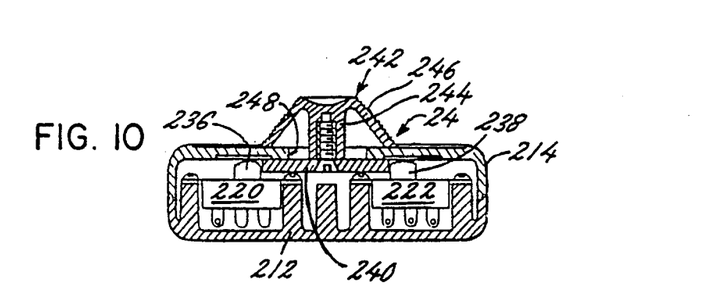
FIG. 10 is a cross-sectional view of the remote control unit taken along the line B—B of FIG. 9.
Figure 11:
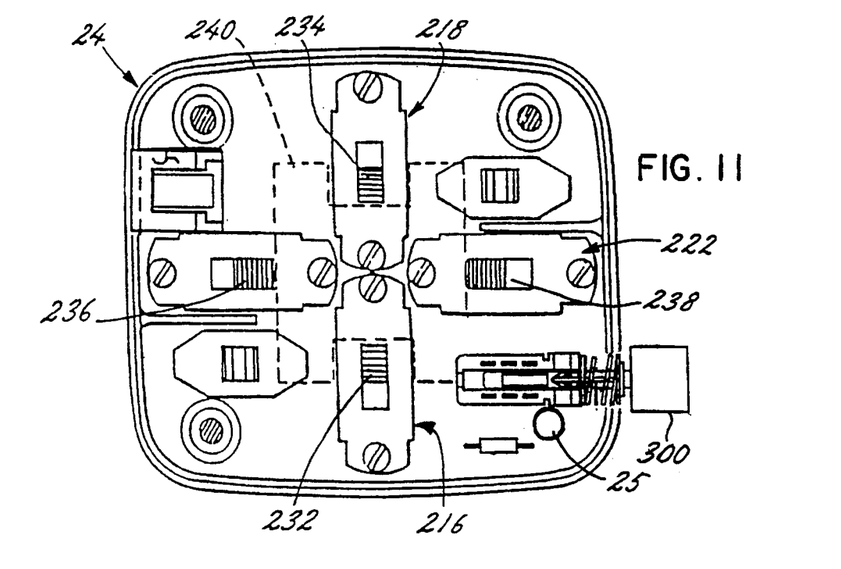
FIG. 11 is a plan view of the remote control unit of FIGS. 9 and 10 with the top cover removed to expose the switch mechanisms for controlling movement of the spotlight.

Referring now to FIGS. 9, 10 and 11, in addition to FIG. 1, the remote control unit 24 includes a two-part casing comprised of a back casing section 212 and a front casing section 214. Mounted within the casing and secured to the back casing section 212 are four single-pole double-throw switches 216, 218, 220 and 222, which respectively include switch blades 224, 226, 228 and 230 and associated slide buttons 232, 234, 236 and 238. The pair of switches 216 and 218 are aligned in a first plane, while the pair of switches 220 and 222 are aligned in a second plane perpendicular to the first plane. Disposed centrally of the switches is a preferably H-shaped switch actuator plate 240, having side edges that are engageable with the respective switch buttons. Associated with the actuator 240 is a manually operable control knob 242, having a central stem portion 244 and an outer conical wall portion 246. The actuator 240 is secured to the inner end of the stem 244, which projects through an opening 248 formed in the front casing section 214. In a conventional manner, a circuit board provides the electrical connections between all of the components in the unit 24.

The inner edge of the conical wall 246 and the actuator plate 240 are slidable over the outer and inner faces respectively of the front casing section 214. The switch blades, and their associated slide buttons, are spring biased to first radially inner positions. The spring biased slide buttons also serve to normally maintain the actuator plate 240 in a central neutral position. The control knob 242 and actuator plate 240 are movable radially outwardly either in line with one of the switches or diagonally relative to an adjacent pair of switches for moving one or any adjacent pair of switch blades from their first positions to second radially outer positions. The switches 216, 218, 220 and 222 are interposed in the electrical circuit of the motors 51 and 87 for controlling energization and direction of rotation of the latter either individually or simultaneously. The multiple conductor cable 17 serves to electrically interconnect the control unit 24 and the spotlight 11.

The electrical circuit for the remote controlled spotlight of the present invention is shown schematically in FIGS. 12A and 12B.

When the spotlight 11 is to be used, a push button 300 of the remote control unit 24 is pressed to energize the lamp 15. Then the control knob 242 of the control unit 24 is manipulated for controlling energization and direction of rotation of the motors 51 and 87.

Referring to FIGS. 9, 10 and 11, when the switch actuator plate 240 is moved upwardly from its central neutral position, the switch blade 226 is moved from its radially inner position to its radially outer position, the elevation motor 87 is energized for rotation in one direction, causing the cable wound about the spool of the capstan.

When the switch actuator plate 240 is moved downwardly from its central neutral position, the switch blade 224 (FIG. 11) is moved from its radially inner position to its radially outer position, the elevation motor 87 is energized for rotation in the other direction, causing the cable to be released from the spool of the capstan.

When the switch actuator plate 240 is moved to the right from its central neutral position, the switch blade 230 (FIG. 11) is moved from its radially inner position to its radially outer position, the azimuth motor 51 is energized for rotation in one direction, and the lamp assembly 25 is rotated in a clockwise direction. Correspondingly, when the switch actuator plate 240 (FIG. 10) is moved to the left from its central neutral position, the switch blade 230 (FIG. 11) is moved from its radially inner position to its radially outer position, the azimuth motor 51 is energized for rotation in the other direction, and the lamp assembly 25 is rotated in a counterclockwise direction.

In addition, the actuator plate 240 may be moved (1) diagonally upwardly to the right to jointly actuate the switches 218 and 222 for simultaneously pivoting the lamp assembly 25 upwardly and rotating it clockwise, (2) diagonally upwardly to the left to jointly actuate the switches 218 and 220 for simultaneously pivoting the lamp assembly 25 upwardly and rotating it counterclockwise, (3) diagonally downwardly to the left to jointly actuate the switches 216 and 222 for simultaneously pivoting the lamp assembly 25 upwardly and rotating it counterclockwise, or (4) diagonally downwardly to the right to jointly actuate the switches 216 and 222 for simultaneously pivoting the lamp downwardly and rotating it clockwise.

The lamp assembly 25 may be stopped at any azimuth position, or at any elevation within its range of 140 degrees, by simply releasing the control knob. The actuated switch blade (or blades) is spring biased back to its radially inner position, and the actuator plate 240 is returned by the switch button (or buttons) of the actuated switch blade (or blades) to its central neutral position. When the switch blades are in their radially inner positions, the motors 51 and 87 are deenergized. When the gears of the drive trains for positioning the light assembly 25 at an azimuth and elevation reach engage or stop, the motors stop rotating substantially instantaneously thus affording precision control. Because of their robust design, limit switches for deenergizing the motors are not necessary at the stops, assuming the user does not maintain power to the motors for a substantial time (e.g., 15–30 seconds) after one of the stops has been engaged and the motor stopped.

Figure 14:
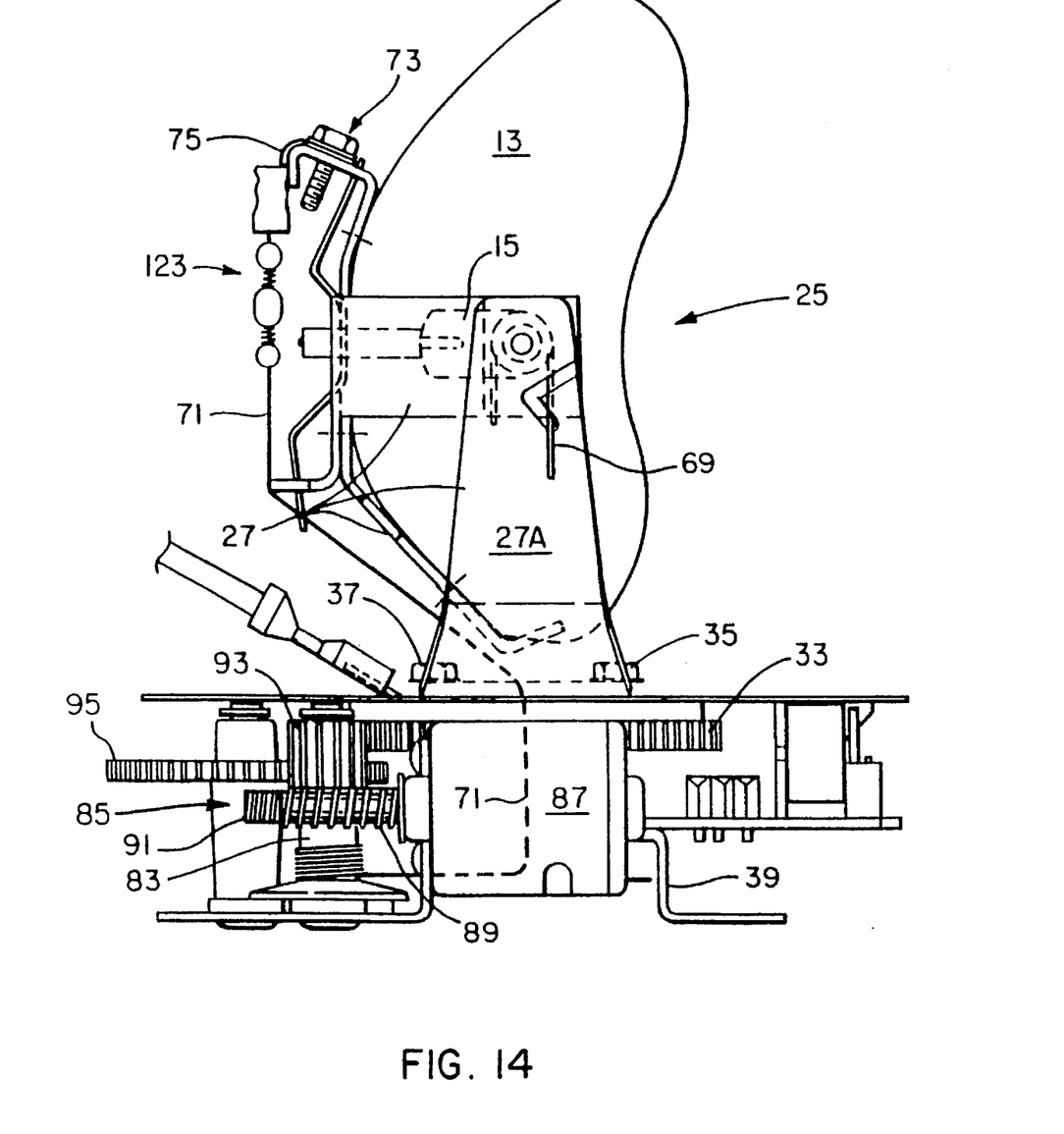
FIG. 14 is the side view of FIG. 4 illustrating the lamp assembly according to a first alternative embodiment that includes a swivel to prevent twisting of the cable.
Figure 15:
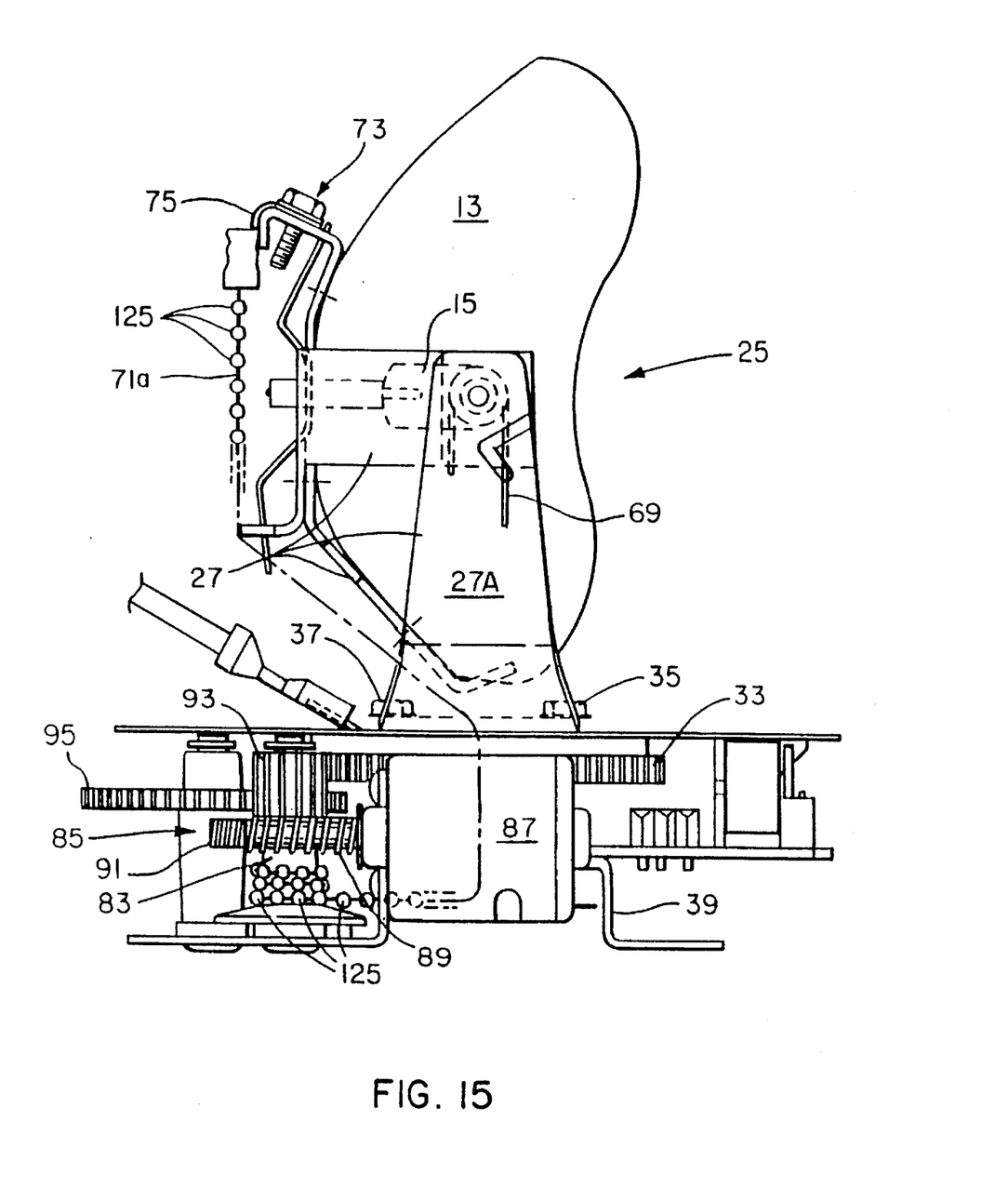
FIG. 15 is the side view of FIG. 4 illustrating the lamp assembly according to a second alternative embodiment wherein the cable comprises a plurality of pivotable links to prevent twisting thereof.

In second and third embodiments illustrated in FIGS. 14 and 15, respectively, the stops are removed so that the lamp assembly 25 may continuously rotate in one direction about the vertical axis 31. In such a configuration, the elevation cable 71 includes at least one pivotable link to enable the extending portion of cable 71 to freely rotate with respect to the other portion that is wound on the capstan 83. As shown in FIG. 14, the pivotable link may comprise a swivel 123 connecting two separate lengths of the cable 71, disposed at a location where the swivel 123 does not interfere with the linear movement of the extending portion of the cable 71 as the other end winds and unwinds on the capstan 83. Thus, it is preferable to dispose the swivel at a location away from the capstan 83 and the bore 77 as shown in FIG. 14. Alternatively, the extending end of the cable 71 may be pivotally fastened to the connector 75 through the swivel 123.

Instead of a swivel, one or more portions of the cable 71 may comprise a plurality of pivotable links 125, such as the common pull-chain cable 71a as shown in FIG. 15. If the entire pull-chain cable 71a is fashioned from the pivotable links 125, the diameter of the bore 77 in hub 29 may be increased as necessary and/or further lined with a grommet or the like (not shown) to allow the links to smoothly pass therethrough. In addition, the diameter of the capstan 83 about which the pull-chain cable 71a is wound is preferably dimensioned with respect to the bending limitations of the pull-chain links 125 to ensure that the winding process does not damage the pull-chain 71a.

While there has been shown and described a preferred embodiment of the present invention, it will be understood by those skilled in the art that various rearrangements and modifications may be made therein without departing from the spirit and scope of the invention.

We claim as our invention:

1. An apparatus for rotating a light beam about a vertical and horizontal axes, the apparatus comprising: a base assembly for mounting to a surface of a vehicle; a reflector assembly mounted on the base assembly including a rotatable reflector and a lamp for illuminating the rotatable reflector and thereby generating the light beam; a mechanism of the reflector assembly for rotatably supporting the reflector for rotation about the vertical and horizontal axes; the mechanism including a hub aligned along the vertical axis for supporting the rotation of the reflector about the vertical axis; a bore in the hub opening to apertures at opposing ends of the hub; a capstan driven by a motor in both clockwise and counterclockwise directions; a flexible cable threaded through the bore of the hub; a first end of the cable coupled to the reflector and a second end coupled to the capstan; a spring for rotationally biasing the reflector about the horizontal axis so that the cable remains taut as the capstan is turned by the motor to take up or let out the cable, thereby rotating the reflector about the horizontal axis.

2. An apparatus as set forth in claim 1 including a light transmissive dome mated to the base assembly for enclosing the reflector assembly.

3. An apparatus as set forth in claim 1 including first and second motors, wherein the first motor is the motor driving the capstan and the second motor drives rotation of the reflector about the vertical axis.

4. An apparatus as set forth in claim 1 including mechanical stops for limiting the rotation of the reflector about the vertical and horizontal axes.

5. An apparatus as set forth in claim 4 wherein the stops for limiting the rotation of the reflector about the horizontal axis include an idler gear driven by the capstan.

6. An apparatus as set forth in claim 4 wherein the stops for limiting the rotation of the reflector about the vertical axis include a lost motion device that allows the reflector to rotate in either a clockwise or counterclockwise direction about the vertical axis through an angle greater than 360 degrees.

7. An apparatus as set forth in claim 1 wherein the capstan is driven to rotate the reflector about the horizontal axis independent of the rotation of the reflector about the vertical axis.

8. An apparatus as set forth in claim 1 wherein the cable includes at least one pivotable link for enabling the free rotation of the cable as the reflector is rotated about the vertical axis.

9. The apparatus of claim 8 wherein the at least one pivotable link comprises a swivel.

10. An apparatus as set forth in claim 8 wherein the cable includes a plurality of pivotable links disposed adjacent one another.

11. An apparatus as set forth in claim 8 wherein the cable is coupled to the reflector by the at least one pivotable link.

12. An apparatus for positioning a light beam at a desired azimuth and elevation, the apparatus comprising: an assembly for generating the light beam including a mechanism for rotating the light beam about two complementary axes; a hub aligned along a first one of the complementary axes forming part of the mechanism and including a bore opening to apertures at opposing ends of the hub; a cable routed through the bore of the hub; a first end of the cable coupled to the assembly for generating the light beam and a second end of the cable coupled to a drive source of the mechanism for moving the cable through the bore in order to rotate the light beam about a second one of the two complementary axes.

13. An apparatus as set forth in claim 12 wherein the mechanism for rotating the light beam includes first and second drive sources, with the first drive source rotating the light beam about the first one of the two complementary axes and the second drive source being the drive source coupled to the cable for rotating the light beam about the second one of the two complementary axes.

14. An apparatus as set forth in claim 13 wherein each of the first and second drive sources independently rotates the light beam about the first and second ones of the two complementary axes, respectively.

15. An apparatus as set forth in claim 13 wherein the first and second drive sources are supported in a base assembly that remains stationary as the light beam is moved by rotation of the beam about the two complementary axes.

16. An apparatus as set forth in claim 13 including a manually operable control that operates the first and second drive sources at variable rates and either separately or in concert.

17. An apparatus as set forth in claim 12 wherein the two complementary axes are vertical and horizontal axes.

18. An apparatus as set forth in claim 12 wherein the mechanism for rotating the light beam about the two complementary axes includes stops for limiting the angles of azimuth and elevation swept by the light beam.

19. An apparatus as set forth in claim 18 wherein the stop for limiting the angle of azimuth swept by the light beam is a lost motion device that allows the light beam to sweep an angle of azimuth greater than 360 degrees.

20. An apparatus as set forth in claim 18 wherein the stops limit the angles of azimuth and elevation swept by the light beam by stalling the drive source.

21. An apparatus as set forth in claim 20 wherein the drive source includes at least one electric motor.

22. An apparatus as set forth in claim 21 wherein the drive source includes a second electric motor rotating the light beam about the second of the two complementary axes.

23. An apparatus as set forth in claim 12 wherein the drive source includes a capstan upon which the cable is wound or unwound in order to sweep the light beam through an angle of elevation.

24. An apparatus as set forth in claim 23 wherein the drive source includes a stop for defining endpoints of a range of elevation angles at which the light beam can be positioned.

25. An apparatus as set forth in claim 12 wherein the cable includes at least one pivotable link for enabling the free rotation of the cable as the assembly is rotated with respect to the drive source about the first complementary axis.

26. An apparatus as set forth in claim 25 wherein the at least one pivotable link comprises a swivel.

27. An apparatus as set forth in claim 25 wherein the cable includes a plurality of pivotable links disposed adjacent one another.

28. An apparatus as set forth in claim 25 wherein the cable is coupled to the assembly by the at least one pivotable link.

29. A spotlight for positioning a light beam at a desired azimuth and elevation, the spotlight comprising: a lamp assembly for generating the light beam and a bracket assembly for supporting the lamp assembly and rotating the light beam about two complementary axes; a base for rotatably supporting the lamp and bracket assemblies and for fixedly supporting a drive source for driving movement of the lamp and bracket assemblies; a cable extending from the drive source to the lamp assembly for rotating the lamp assembly about one of the two complementary axes so as to provide a range of elevation at all azimuths that exceeds 90 degrees from a horizontal reference plane, thereby eliminating blind spots at a zenith.

30. An apparatus as set forth in claim 20 wherein the cable includes at least one pivotable link for enabling the free rotation of the cable as the lamp assembly is rotated about a first of the two complementary axes.

31. An apparatus as set forth in claim 30 wherein the at least one pivotable link comprises a swivel.

32. An apparatus as set forth in claim 30 wherein the cable includes a plurality of pivotable links disposed adjacent one another.

33. An apparatus as set forth in claim 30 wherein the cable is coupled to the assembly by the at least one pivotable link.

* * * * *